Jan. 24, 1956 H. GUNKEL 2,731,814
OVERLOAD SAFETY DEVICE FOR HOISTING APPARATUS OR THE LIKE
Filed Jan. 2, 1953 2 Sheets-Sheet 1

INVENTOR.
HEINRICH GUNKEL
BY

INVENTOR.
HEINRICH GUNKEL

United States Patent Office 2,731,814
Patented Jan. 24, 1956

2,731,814

OVERLOAD SAFETY DEVICE FOR HOISTING APPARATUS OR THE LIKE

Heinrich Gunkel, Dusseldorf, Germany, assignor to Hans Putzer, Dusseldorf, Germany Application January 2, 1953, Serial No. 329,376

1 Claim. (Cl. 64—30)

This invention concerns overload safety devices for hoisting or the like apparatus, for example, cable or chain-operated traction systems.

In hoisting or the like apparatus, it is desirable that warning should be given to an operator when the safe working load of such apparatus has been, or is being, exceeded, so that straining of the apparatus may be rectified or avoided before failure thereof occurs. It is an object of this invention to provide a simple warning or safety device for this purpose.

Hitherto, a safety device in the form of a "weak link" has been incorporated in hoisting or like apparatus, the load capacity of such link being less that that of the remainder of the apparatus so that strain or failure of the link will occur before the remainder of the apparatus is strained, and thus provide the desired warning.

Thus in cranes and like hoisting apparatus, the said weak link may comprise the hook or other load-carrying member, such hook or member being of a strength such that it will bend or otherwise be obviously deformed should the apparatus be overloaded. In the case of a hook the latter may be made of such a strength that it will open out upon being subjected to a load greater than the safe working load of the apparatus.

The main disadvantage of such an arrangement lies in the fact that the strength of a hook or member constituting the said weak link is not exactly determinable; for example hooks forged under similar conditions in the same die may differ sufficiently in material and dimensions to have widely different strengths. As a result of this, the remainder of the apparatus must have a wide margin of strength over the average strength of the hook or member so that an unexpectedly strong hook or member will not fail to be deformed under a load within the capacity of the apparatus. Such a wide margin of strength naturally leads to uneconomic construction in that an exceptionally weak hook or member will deform under loads well below the safe working load of the apparatus.

Especially where hooks constitute the said weak links, opening of the said hooks is dependent upon the bending moment applied thereto by the load; thus whilst a given load acting near the nose of the hook may cause opening of the hook, the same load supported by a part of the hook near the shank thereof may not cause any opening.

Yet another disadvantage of the above arrangement lies in the necessity for an operator to watch the weak link as each load is taken up, thereby to note any deformation of the link and to stop the apparatus in good time; since the operator is usually concerned with the movement and/or position of the load at this moment, failure of the link may occur unexpectedly with possibly dangerous consequences.

Another known form of safety device comprises a pin which locks two relatively movable parts of the driving mechanism of the apparatus against such movement, the pin being subjected to shearing forces between the two said parts and proportional to the load carried by the apparatus; the pin, of course, is of a strength such that it will shear and disconnect the load from the driving mechanism should such load exceed a predetermined value.

The edges which apply said shearing force to the said pin naturally become worn and blunt after use with the result that the load necessary to bring about shearing of the pin increases; however, the apparatus itself may wear in use with the result that its load-carrying capacity decreases and hence, in time, it may happen that the pin will support a load which the apparatus it is intended to protect cannot support. Apart from this disadvantage, it will be appreciated that the shearing of the pin causes an abrupt release of the load without any warning, which may be dangerous; with hand-driven apparatus, the operator may cause himself damage when the pin suddenly and unexpectedly shears.

It is, therefore, another object of the present invention to provide a device in which the aforesaid disadvantages of prior constructions are absent.

It is yet another object of the present invention to provide a safety device for incorporation in the drive of hoisting or like apparatus, comprising a driving member and a driven member coaxially arranged one about the other, and a resilient friction ring trapped between said members to engage the opposed peripheries thereof, the said opposed peripheries of the said members being spaced such that the frictional resistance to relative movement between the members corresponds to the torque transmitted through the device when the apparatus carries its maximum safe working load.

With such an arrangement, slippage occurs between said members and said friction ring when the maximum safe working load of the apparatus is attained. In hand-driven apparatus, the fall in the torque transmitted by the device when the said slippage occurs is readily perceptible to the operator, but insufficient to let him cause himself damage; the said fall in torque is, of course, a result of the difference between the static and dynamic coefficients of friction operative between the said members and the ring.

It is also another object of the present invention that the said opposed surfaces of the said driving and driven members are hardened and ground and are preferably formed of highly wear-resistant material.

After prolonged use, slippage between said members and the said ring causes wear of the co-operating surfaces thereof; this wear results in slippage occurring at lower torque values and, by appropriately constructing the device, it can be arranged that the decrease in torque-transmitting capacity of the device will keep pace, in use, with the wear of the apparatus with which it is used so that as the maximum safe working load of the apparatus diminishes with use thereof, so the maximum torque transmissible by the safety device diminishes.

By suitable enclosure and construction, the device can be rendered unaffected in operation by external influences.

With these and other objects in view which will become apparent in the following detailed description, the present invention will be clearly understood in connection with the accompanying drawings, in which.

Figure 1:
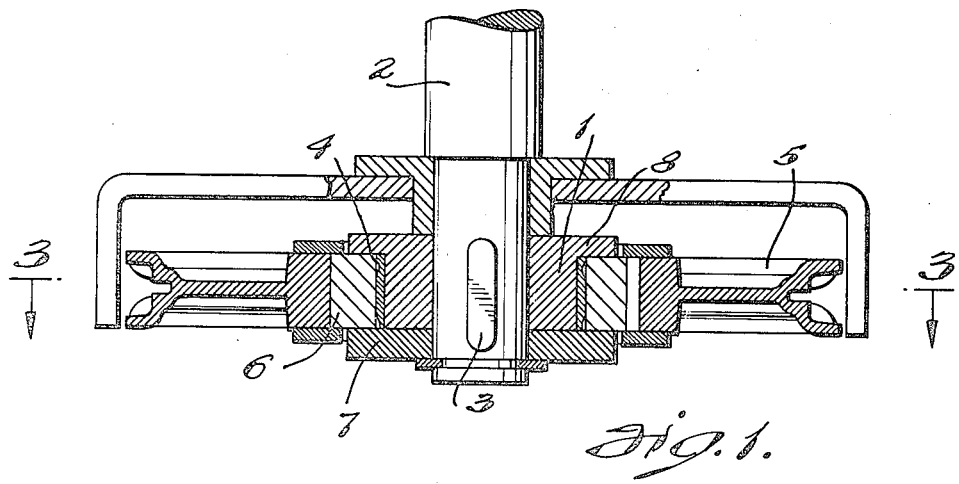
Figure 1 is a sectional view of a device for use with chainwheel-driven apparatus.
Figure 3:
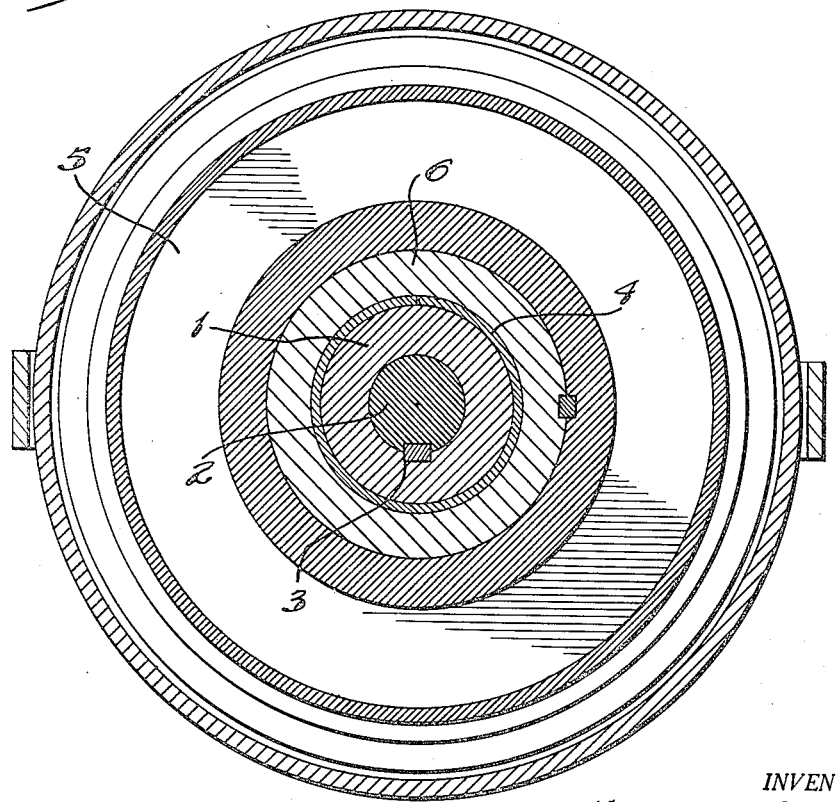
Fig. 3 is a section along the lines 3—3 of Fig. 1.

Referring to Figs. 1 and 3, in which one embodiment of the invention is disclosed, it will be seen that the device comprises a driven member 1 in the form of a flanged disc secured to a driven shaft 2 by means of a key 3 engaging a key way in the member 1. The shaft 2, may, for example, form the driving shaft of a pulley block.

A resilient friction ring 4 embraces the periphery of the member 1 and is surrounded by a driving member in the form of an annulus 6; the internal diameter of the annulus 6 is such that the ring 4 is trapped between its inner periphery and the periphery of the driven member 1 with a compression such that the frictional resistance to relative rotation between the members 1 and 6 is equal to the maximum torque which may be safely transmitted to the shaft 2.

A chainwheel 5 is carried by the annulus 6 so that the latter may be rotated by rotation of such chainwheel in the usual way.

It will be seen that the resilient friction ring 4 and annulus 6 are axially positioned with respect to the member 1 by being trapped between a flange 8 on the latter and a ring 7 carried by the shaft 2.

Obviously, the chainwheel 5 could be replaced by a hand crank or hand wheel, or by a power-driven member.

Figure 2:
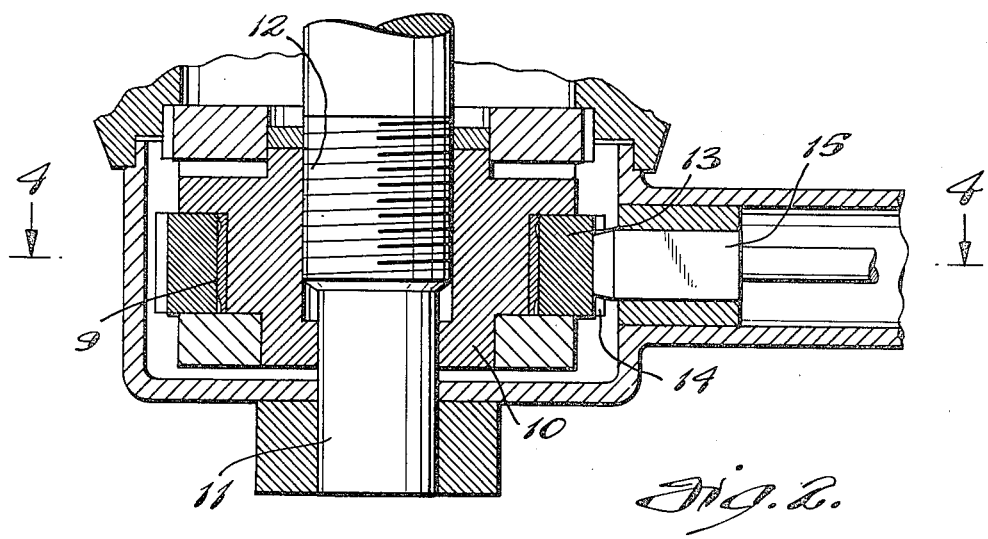
Fig. 2 is a sectional view of a device for use with ratchet-driven apparatus.
Figure 4:
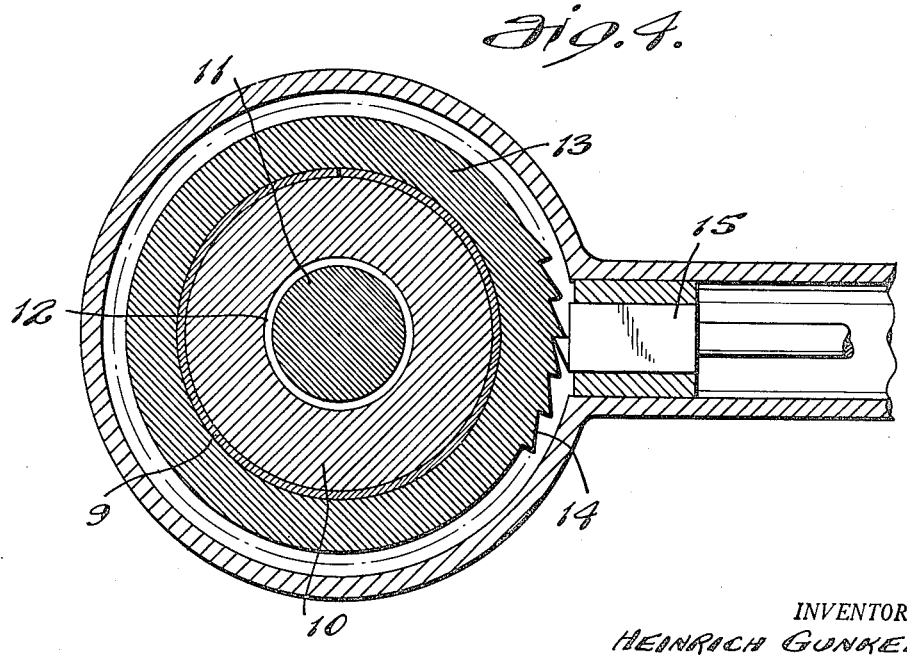
Fig. 4 is a section along the lines 4—4 of Fig. 2.

Referring now to Figs. 2 and 4, in which a second embodiment is disclosed, a driven member 10 is internally screw-threaded and screwed on to a threaded portion 12 of a driven shaft 11, the screw-thread arrangement serving to urge the member 10 against lateral friction members to generate a braking force when the shaft 11 tends to drive the member in the "reverse" direction.

A resilient friction ring 9 is trapped between the periphery of the member 10 and the inner periphery of a driving member 13 in the same manner as in the previously described embodiment, whilst the outer periphery of the member 13 is furnished with notches 14 for co-operation with a ratchet pawl 15.

While I have disclosed two embodiments of the present invention, it is to be understood that these embodiments are given by example only and not in a limiting sense, the scope of the present invention being determined by the objects and the claim.

I claim:

A safety clutch for incorporation in the drive of hoisting or like apparatus, comprising a driving member and a load carrying driven member coaxially arranged one about the other, opposed surfaces of the said driving and the said driven member being formed of hardened and ground wear-resistant material, and a friction ring trapped between said members to engage the said opposed surfaces thereof and having resiliency in substantially radical direction, the said opposed surfaces of the said members being spaced such that the frictional resistance to relative movement between the members corresponds to the torque transmitted through said safety clutch when the apparatus carries its maximum safe working load.

References Cited in the file of this patent

UNITED STATES PATENTS

| | | |
|---|---|---|
| 2,032,900 | Alger | Mar. 3, 1936 |
| 2,111,245 | Irgens | Mar. 15, 1938 |

OTHER REFERENCES

Scientific American page 272, May 1941, Article entitled, "Overload Device."